Dec. 29, 1964    R. H. SCHAFER ETAL    3,163,748
DATA CHECKING APPARATUS
Filed Nov. 21, 1961    5 Sheets-Sheet 1

INVENTORS.
ROBERT H. SCHAFER.
DAVID C. SCHLICK.
BY
AGENT

INVENTORS.
ROBERT H. SCHAFER.
DAVID C. SCHLICK.
BY
AGENT.

INVENTORS.
ROBERT H. SCHAFER.
DAVID C. SCHLICK.
BY
AGENT.

Dec. 29, 1964  R. H. SCHAFER ETAL  3,163,748
DATA CHECKING APPARATUS
Filed Nov. 21, 1961  5 Sheets-Sheet 4

INVENTORS.
ROBERT H. SCHAFER.
DAVID C. SCHLICK.
BY

AGENT.

INVENTORS.
ROBERT H. SCHAFER.
DAVID C. SCHLICK.
BY
AGENT.

United States Patent Office 3,163,748
Patented Dec. 29, 1964

3,163,748
DATA CHECKING APPARATUS
Robert H. Schafer, Farmington, Mich., and David C. Schlick, Waltham, Mass., assignors to Burroughs Corporation, Detroit, Mich., a corporation of Michigan
Filed Nov. 21, 1961, Ser. No. 153,877
19 Claims. (Cl. 235—153)

This invention relates generally to data checking apparatus for bookkeeping machines and more particularly to an electronic apparatus for calculating a check digit for employment in connection therewith.

It is the purpose of a data checking system to detect errors arising from erroneous entries or transposition of figures in a bookkeeping operation. An example of an application of the system may be seen in a posting operation where an old balance from a ledger being processed is entered by the operator preparatory to beginning the posting operation. It will be appreciated that the accuracy of the entry of the old balance is critical. The advantage of the present invention is that the bookkeeping machine will itself calculate and print a check digit related to the balance at the end of each posting operation preparing the balance for a verification check at the beginning of each new posting operation, thus eliminating the need for pre-calculation of the digit or reference to tables by the operator.

It is an object of this invention to provide means for preparing any number as a self-checking number.

It is a further object of this invention to provide an improved electronic system for generating and processing pulse trains related to the digital values of a number and calculating a check digit for subsequent verification procedure.

It is a further object of this invention to provide a check digit calculator operable in a synchronized relation to a printing apparatus for recording the check digit for subsequent use in a verification procedure.

It is an additional object of this invention to provide a direct complementing and read-out system for calculating and printing a check digit.

In accordance with the foregoing objects, the invention first briefly described includes a pulse distributor for generating a pulse for each digital value of a multidigit amount, a weighting matrix for weighting the digits, an encoder for transforming the weighted digits into pulse trains representative of a substitute number, a counter having an "$n$" capacity, a flip flop controlled in its change of condition by the counter, a complementing means comprising a second pulse distributor, and a differentially positionable data rack in the bookkeeping machine effective to initiate the operation of the complementing means and controlled in its selective positioning by the change of condition of the flip flop.

The embodiment of the present invention will be shown as incorporated in a bookkeeping machine of the general type disclosed and claimed in U.S. Patent 2,629,549, issued to T. M. Butler on February 24, 1953, and of common ownership herewith. Only the basic elements of the bookkeeping machine and those which are of interest with respect to the present invention will be shown and described herein.

The invention will now be described, by way of example, with reference to the accompanying drawings, in which.

Arrangements for accurately controlling the entry of numbers in bookkeeping and tabulating machines are well known. In furtherance of the purpose to control the accuracy of numbers, the data cards or documents may be provided with additional characteristic marks corresponding to a figure or check digit. The check symbol calculated by the bookkeeping machine may be entered on the document at the end of a posting operation to insure its correct pick-up at the beginning of a new posting operation. In the embodiment shown of the present invention, the modulus 10 system is utilized to calculate the check digit after a summation of the weighted and unweighted digits. According to the weighting system used in the invention, even columns of the number are unweighted. Odd columns, beginning with the column having the digit of lowest denominational order, are multiplied by the factor two and excess nines are cast out. The following transformations are made to the digits in the odd numbered columns: 1-2; 2-4; 3-6; 4-8; 5-1; 6-3; 7-5; 8-7; and 9-9. As will be obvious from the description hereinafter, by alterations of the weighting matrix and the counter, any code system may be utilized. After the original number has been weighted and transformed into a substitute number, a required number of digits must be added to complement the sum of the digits of the substitute number to the next higher decade. This number of required digits is the check digit number to the base "$n$" with "$n$" equal to ten in the present embodiment. Otherwise stated, the check digits value must be the tens complement of the sum of the digits of the substitute number. In a subsequent verification operation, the digits of the original number are re-entered into the counter after encoding, together with the check digit value. If the counter, which is cyclically operable to the base "$n$," is in a zero position, verification is complete, and the operation of the bookkeeping machine is continued. Since the present invention is concerned primarily with the method of calculating and printing a check digit symbol, the verification operation will not be considered in detail herein.

Figure 1:
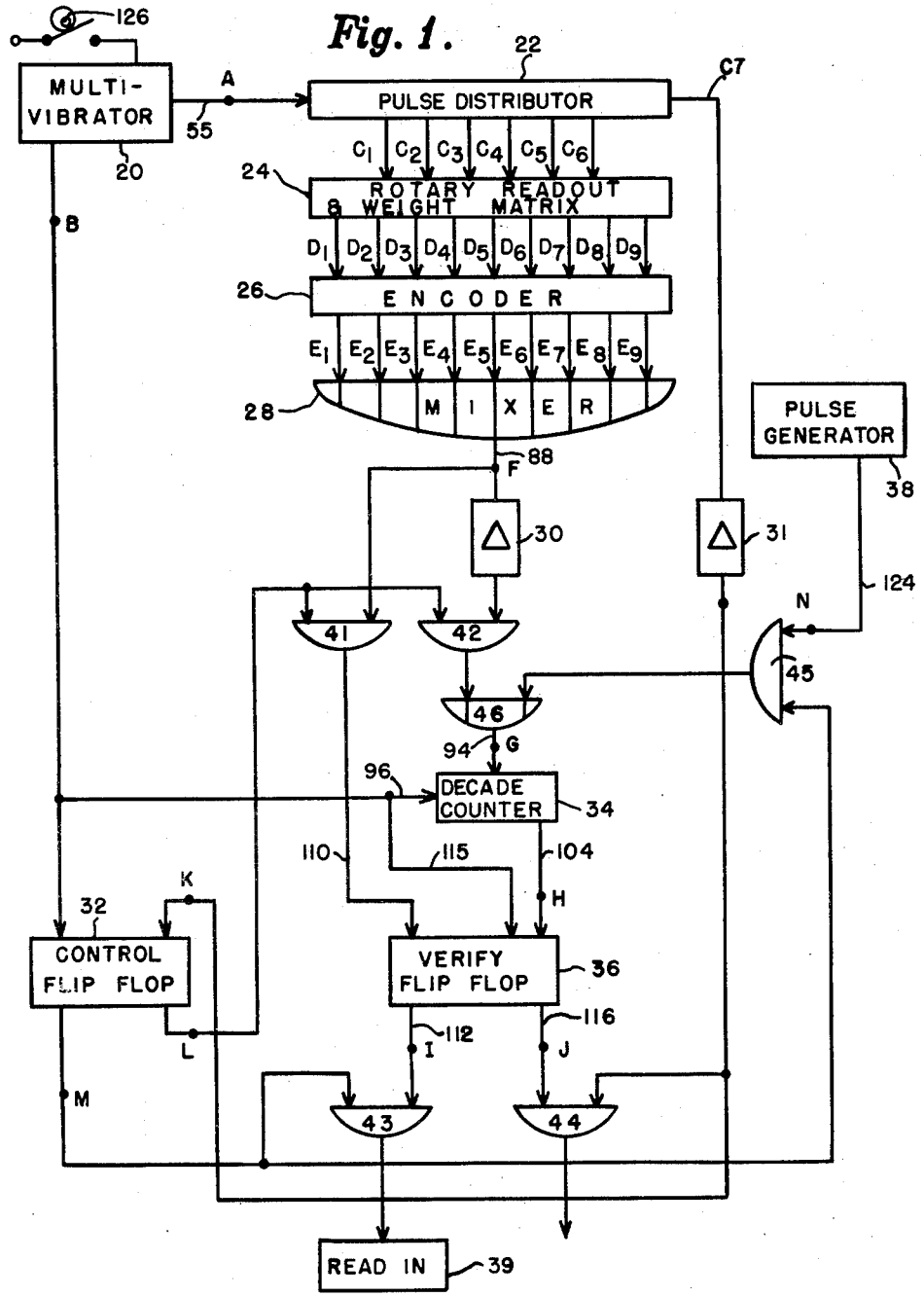
FIG. 1 is a block diagram of the check digit calculating system.

FIG. 1 shows the basic components of the check digit calculating system in logic block form. Included are a single shot multivibrator 20, a pulse distributor 22, a rotary read-out and weight matrix 24, an encoder 26, a mixer stage 28, delay stages 30 and 31, a control flip flop 32, a decade counter 34, verify flip flop 36, a pulse generator 38 and a read-in unit 39. The outputs of the aforementioned components are selectively gated and delayed in the manner illustrated by gates 41, 42, 43, 44, 45 and delays 30 and 31. The outputs of gates 42 and 45 are directed to a mixer 46 which furnishes an output to decade counter 34. Transistorized single shot multivibrators, gates, and mixers are well known in the computer art and extensively described in the literature, as for example, the book entitled Transistors Handbook by W. D. Bevitt, published by Prentice-Hall, Inc. in 1956. Therefore, a detailed description of these circuits is omitted.

Figure 2:
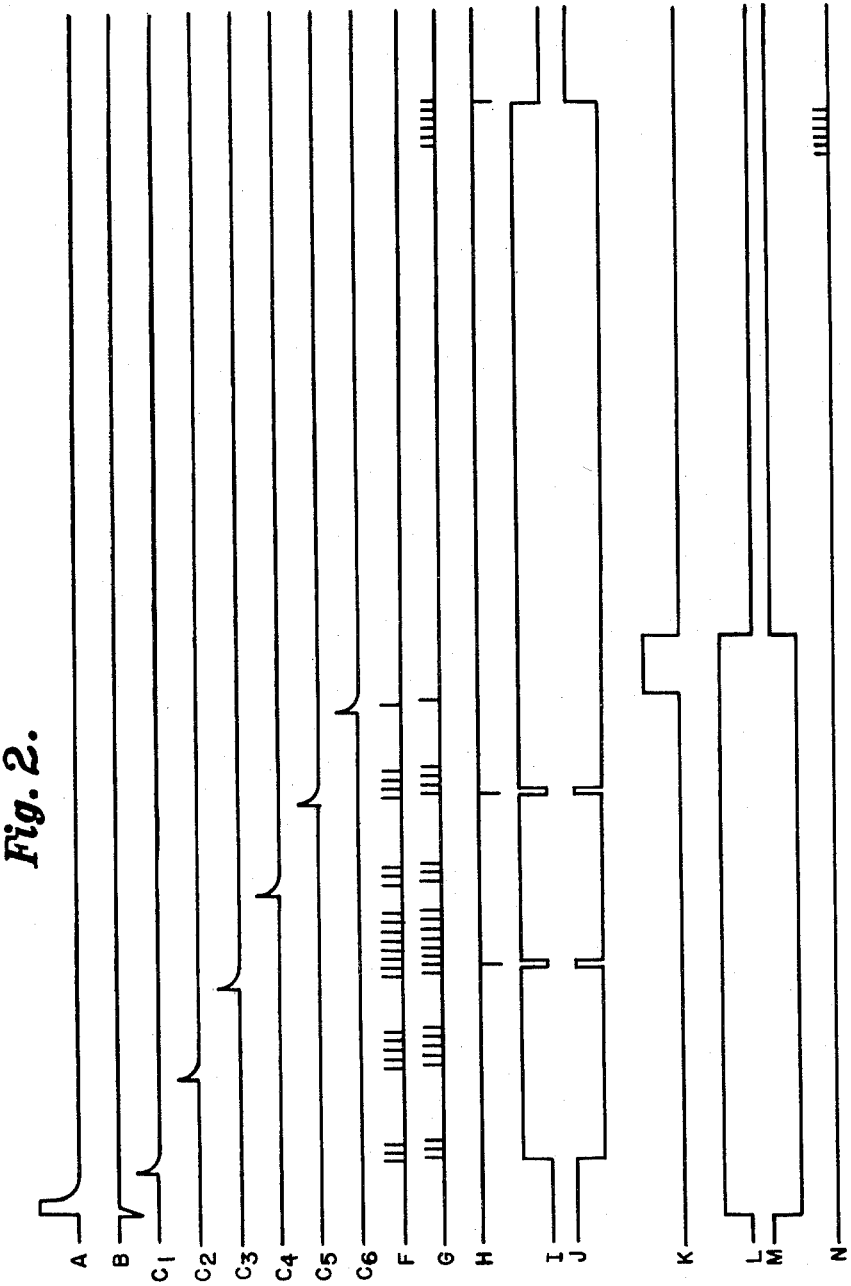
FIG. 2 is a voltage wave diagram illustrating the manner of operation and cooperation between various electrical components in the system.

FIG. 2 shows the voltage wave forms at designated points and at relative times in the system. The system shown provides for the calculation of a check digit for a multi-digit number having six digits. As an example, we will consider the calculation for the number 123456 ( ) with the brackets indicating the position of the printing of the check digit symbol to be calculated and printed therein to the right of the original number. The various wave forms and their significance will be discussed fully hereinafter in the section entitled "Description of Operation."

Figure 3:
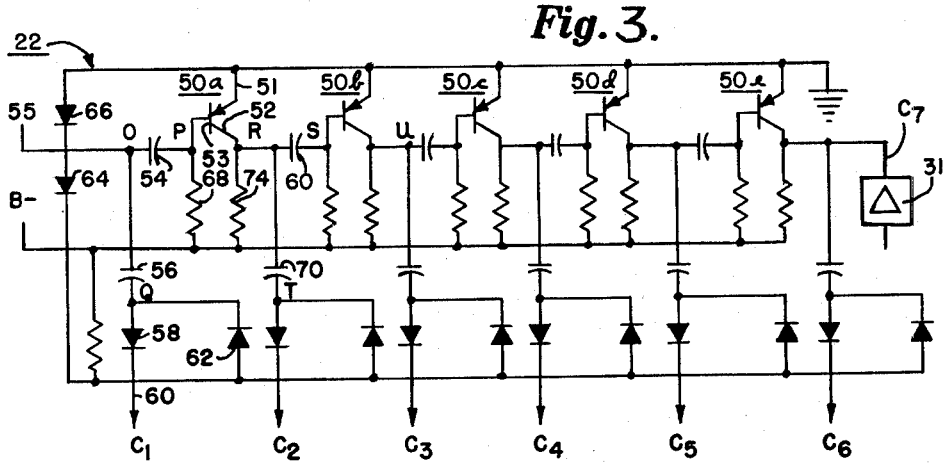
FIG. 3 is a circuit diagram of the first distributor.

FIG. 3 is a circuit diagram of the first pulse distributor 22. The function of pulse distributor 22 is to produce any number of substantially equally time-spaced pulses on distinct output lines C1–C6 depending on the number of digits in the original number. These pulses are used to sense or read the state of the rotary read-out switches in the rotary read-out stage 24 following and to initiate the action of the encoder 26. The pulse distributor 22 also is used to furnish a final sense pulse which is the last column pulse delayed and shaped by delay stage 31. The timing requirement imposed upon pulse distributor 22 is to provide a time interval between two successive distributor pulses sufficient to allow generation of as many as 9, or 10 in modulus 11 system, pulses in the following encoder stage 26. The operation of the distributor 22 is sequential in nature whereby the five transistors 50a–50e are coupled in cascade. Since the stages are essentially the same, a discussion of the first and second stage operation will be sufficient to describe operation of the pulse distributor 22. Transistor 50a, a PNP transistor with a grounded emitter 51, a collector 52 and a base 53, is conducting in the quiescent state and receives a positive going pulse from the single shoe multivibrator 20 on input lead 55. Transistor 50a and the transistors 50b–50e in the succeeding stages likewise remain conducting so long as their base potential is negative relative to their collector potential. The positive input pulse to transistor 50a raises the potential at point 0 from −10 to 0 volts. The voltage at the base emitter junction of transistor 50 rises from 0 to +10 volts effectively shutting off transistor 50a. The voltage at point Q beyond capacitor 56 is raised from −.5 to +9.5 volts, and this positive outgoing pulse passes through diode 58 and output lead $C_1$ to the rotary read-out unit 24. It will be noted that the collector voltage at point R dropped from 0 to approximately −10 volts as transistor 50 was cut off. Capacitor 54 discharges through base resistor 68 until transistor 50 is turned on again. The time interval is determined by the RC discharge time constant as set by the values of capacitor 54 and resistor 68. Diode 62 provides a low resistance charging path for capacitor 56. The positive voltage rise at point R cuts off the next transistor 50b and the voltage changes at points S, T, and U and follow in the same manner as described for points P, Q, and R. Thus, the sequence of events is repeated with the charge and discharge of capacitor 70 to produce a positive voltage rise transmitted as a positive output pulse through C2 and a voltage rise transmitted to the next following transistor. The output from the fifth transistor stage 50e taken from its collector and after passage and shaping of the pulse by delay 31, as shown in FIG. 1, is shown as pulse form K in FIG. 2.

Figure 4:
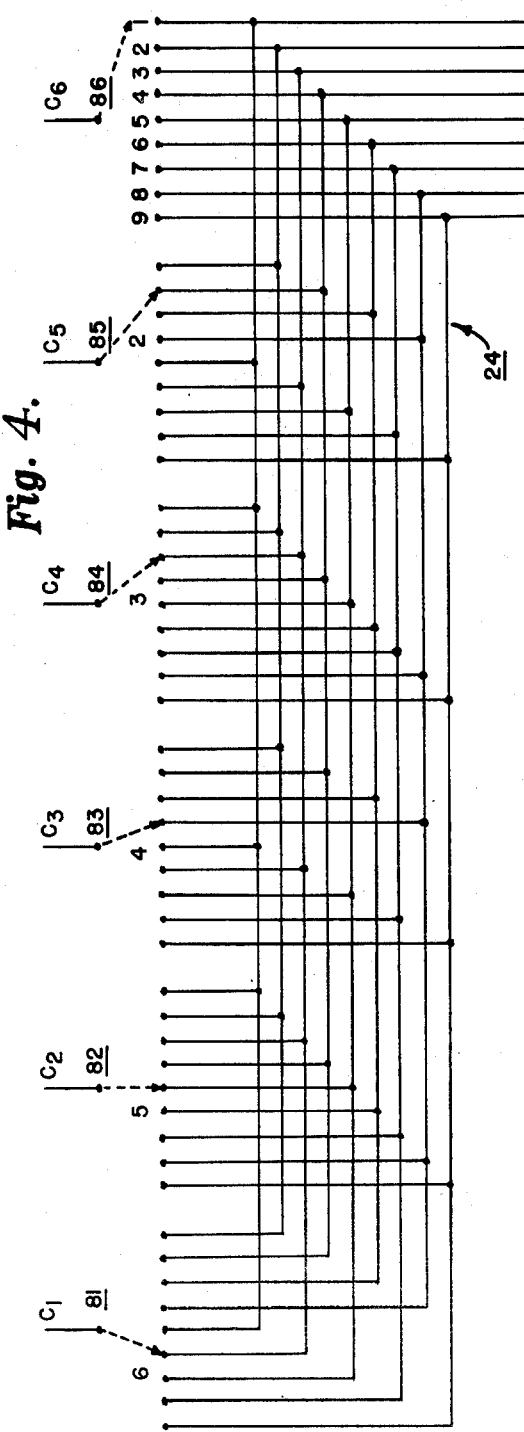
FIG. 4 is a schematic of the rotary read-out and column weighting matrix.

FIG. 4 shows a schematic representation of the rotary read-out unit 24 which has the function of a non-destructive decimal storage unit. Six individual rotary read-out switches 81–86 are provided to give an electrical representation of the multidigit amount indexed from the keyboard of the bookkeeping machine or from an accumulator in a manner shown and described in U.S. Patent 2,955,755 issued to R. S. Bradshaw and of common ownership herewith. Each switch 81–86 is schematically shown in correspondence with the digit columnar location from 1–6. Each switch 81–86 further has a single input lead from the pulse distributor unit 22 and nine output leads. Also shown is the weight matrix associated with the read-out switches. Since the columnar location left available for printing of the check digit is preferably next to the right of column 1, the weighting is done for columns 1, 3 and 5. Since rotary switch 81 is in column 1, the decimal position settings thereof are weighted to give a decimal output from leads $D_1$–$D_9$ in accordance with the transformation system hereinbefore explained. Columns 2, 4 and 6 have the settings of their rotary switches transmitted without change.

Figure 5:
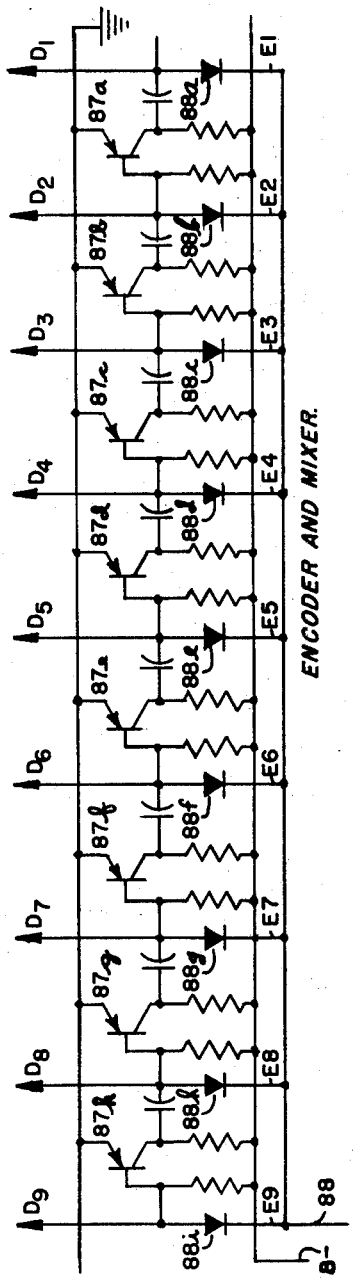
FIG. 5 is a schematic of the encoder and mixer circuits.

FIG. 5 shows the schematic for the encoder stage 26 which is essentially similar in its components and mode of operation to the pulse distributor 22 hereinbefore described in connection with FIG. 3. The pulse encoder 26 has nine, or ten for modulus 11 system, decimal inputs $D_1$–$D_9$ from the preceding rotary read-out and weight matrix stage 24 which correspond to the nine digital positions 1–9, excluding 0, of the rotary read-out switches 81–86. The encoder and mixer units have a single output lead 88 which is coupled to gate 41 and to the delay stage 30 of FIG. 1. The operation of the encoder may best be explained by way of example. If a distributor pulse is fed through rotary read-out switch 81 and a digit "six" is stored therein, the "six" will be transformed or weighted into an output on the third output lead $D_3$. When the pulse is received in the third stage of the encoder 26, it will sequentially cut off the third transistor stage and the following two stages to the right. Thus the encoder 26 will generate a number of pulses equal to the number of stages that are sequentially activated in the same manner as done in the first pulse distributor 22. These pulses will thus be emitted by the encoder and mixer unit 26, 28 through its single output lead 88. In the case of the digit "six" in the first column, an output of three pulses will be emitted through the mixer 28 which comprises nine output diodes 88a–88i. The speed with which a pulse is propagated through the encoder 26 is inversely proportional to the size of the inter-stage coupling capacitor and its associated resistor. The values of the coupling capacitors and resistors in the encoder 26 are necessarily adjusted to produce a time constant in the encoder substantially smaller than that in the first pulse distributor 22. Thus at least nine pulses can be produced in the encoder 26 between successive pulses from pulse distributor 22.

Figure 6:
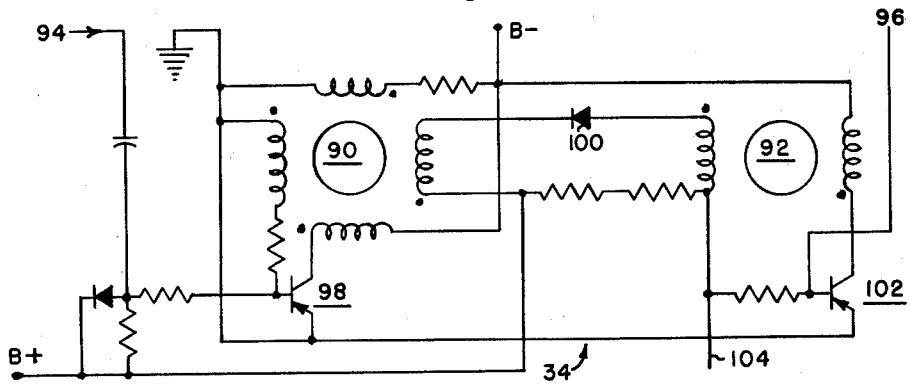
FIG. 6 is a schematic of the decade counter.

FIG. 6 shows the decade counter 34 which takes ten input pulses to give an output pulse. In addition to producing the output pulse, the counter resets itself to ready itself for performance of another tens count. Counter 34 is coupled to and drives control flip flop 36 as shown in FIG. 1 in a manner which will be explained in the section "Description of Operation" hereinafter. The counter circuit utilizes a combination of two magnetic cores—a quantizing core 90 and a counting core 92. The quantizing core 90 is so designed that it is switched completely from one retentivity point to a saturation in the opposite direction for each negative input pulse. Therefore, since the output pulses from the mixer 28 and from pulse distributor 38 are positive pulses, as shown by pulses G in FIG. 2, it is necessary to invert these pulses. This inversion can be accomplished by use of any of the many known inverting circuits prior to supplying of these pulses to input lead 94 of decade counter 34. The output of the quantizing core 90 is fixed and independent of the amplitude of the input pulse that switches the core so long as the signal amplitude reaches a predetermined minimum value. The multistable or counting core 92 is driven by the output pulse from the quantizing core 90 and is so designed that the counting core has its magnetization increased by a definite incremental amount each time the quantizing core 90 switches. When the counting core 92 reaches its last stable, i.e., its tenth state, the cores are coupled so that the next output signal from the quantizing core 90 will cause a reset of the counting core 92 to its initial retentivity condition. A pulse is then obtained from the output transistor of counting core 92 to set control flip flop 36. Quantizing core 90 receives its pulse input from mixer 46 through lead 94 while lead 96 is provided to carry a negative reset pulse from multivibrator 20 to counting core 92. Transistor 98 and quantizing core 90 form a regenerative switching circuit. When this circuit is triggered by an input pulse, it fully switches the quantizing core 90 from one saturation state to the opposite state. This generates an energy pulse which is transferred through the associated windings and diode 100 to counting core 92. To achieve the count of ten each quantizing core 90 output delivers essentially $\frac{1}{10}$ the total energy required to switch the counting core 92. During the tenth energy transfer, transistor 102 conducts in a regenerative manner to reset the quantizing core 90 and furnish an output signal on lead 104 thus indicating the completion of a count of ten and effective to set control flip flop 36.

Decade counter 34 is essentially similar in its components and mode of operation to the decade counter shown and described in U.S. application No. 498,257, now U.S. Patent 3,102,239, filed in behalf of Tung Chang Chen and Robert A. Tracy and of common ownership herewith.

Figure 7:
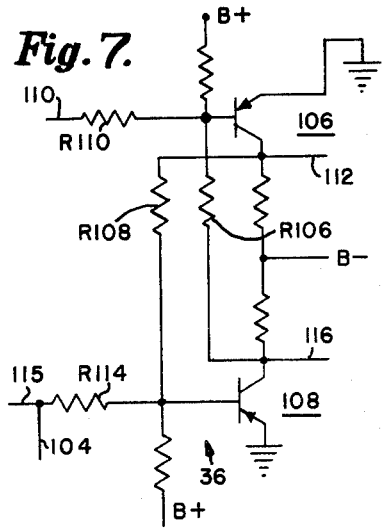
FIG. 7 is a schematic of the control flip flop.

FIG. 7 shows a schematic of a bistable control means herein embodied as verify flip flop 36. Verify flip flop 36 has the function of changing its state responsive to an output from counter 34 created by the required number of pulses from the pulse generator 38. Verify flip flop 36 comprises transistors 106 and 108 and is a standard transistor type flip flop configuration with cross coupling and grounded emitters and is adapted for base triggering. Transistor 106 has an input to its base from gate 41 on lead 110 and an output on lead 112 to gate 43. Transistor 108 has an input to its base from counter 34 on lead 104, an input from multivibrator 20 on lead 115, and an output on lead 116 to gate 44. When the verify flip flop 36 is in one stable condition, transistor 108 is "on," and transistor 106 is "off." In this condition the collector of transistor 108 is substantially at zero voltage. Therefore, transistor 106 is held cut off since its base is maintained at a potential positive with reference to its emitter. Transistor 108 is maintained in an "on" or conductive state through R108. If a negative pulse is transmitted through lead 110 and base resistor R110, transistor 106 will be turned on. This cuts off the drive to transistor 108 through R108 and now transistor 106 is held on through R106. This condition with transistor 106 "on" and transistor 108 "off" continues until the next negative pulse is furnished to the base of transistor 108 through lead 104 or 115 and base resistor R114. The stable condition when transistor 108 is on and furnishing an output to gate 44 through lead 116 will be hereinafter referred to as the "set" condition of verify flip flop 36. The stable condition when transistor 106 is on and furnishing an output to gate 43 through lead 112 will be hereinafter referred to as the "reset" condition of verify flip flop 36.

Figure 8:
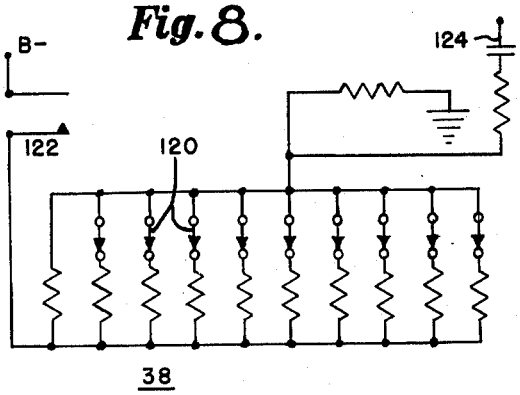
FIG. 8 is a schematic of the second pulse distributor used in the system.
Figure 9:
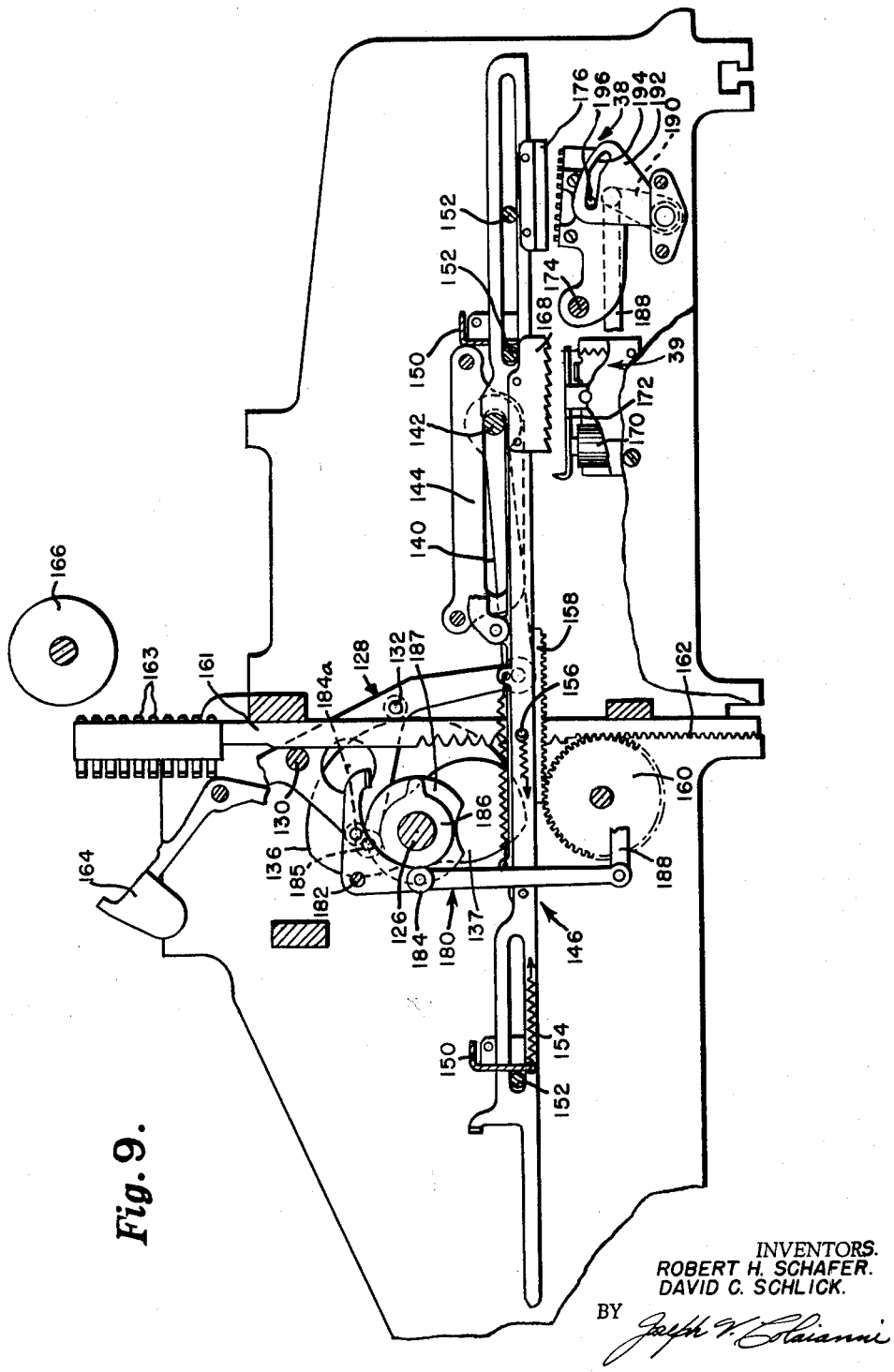
FIG. 9 is a right side view of a bookkeeping machine showing the electromechanical and mechanical components of the check digit calculator read-in and printing mechanisms.

FIG. 8 is a schematic of the second pulse generator 38 which serves the function in the present embodiment of a complementer. In other words, it furnishes a sufficient number of pulses to count the decade counter 34 to zero to accomplish the calculating of the value of the check digit and effectively control the read-in and print mechanism associated with the bookkeeping machine as shown in FIG. 9 hereinafter. Pulse generator 38 includes a series of decimal switches 120 which are mechanically positioned in a manner by which all are closed preparatory to operation as will be shown in FIG. 9.

A source of B— voltage is applied to the bank of switches by the closure of switch 122 through the control of a selectively operated function control means such as a manually operated key or a carriage position operated program panel of the type shown and described in the aforementioned Butler patent. The switches 120 are then opened sequentially at equally time spaced intervals to produce a staircase voltage waveform which is differentiated by a standard RC differentiating circuit, of which the condenser is shown in FIG. 8, and thus resulting in a series of positive going pulses to gate 45 through lead 124.

FIG. 9 is a right side view of the bookeeping machine with parts broken away in a manner to best illustrate the manner in which the check digit is read into the machine and the manner in which the print out operation of the check digit is accomplished.

The drive mechanism for the bookkeeping machine includes a motor driven main cam shaft 126 which is given one complete counterclockwise revolution during each operation of the machine. Bell crank 128 is pivotally mounted on stud 130 on a side frame of the machine and carries a pair of cam rollers 132 and 185 which cooperate with complementary cams 136 and 137, respectively, mounted on cam shaft 126. Bell crank 128 is coupled at its lower end to link 140 which carries a transversely oriented bail rod 142. As is apparent from the drawing, counterclockwise rotation of cam shaft 126 will drive bail 142 first forwardly and then rearwardly in the machine during one cycle of operation. A longitudinally slotted guide plate 144 is provided to control the path of movement of the bail rod 142. Also shown is cyclically operable data rack 146 which is differentially positionable under the control of the read-in unit 39 situated rearwardly in the machine. It is the function of the data rack 146 to control the printing apparatus to selectively print out the check digit as calculated. The data rack 146 is thus movable forwardly and rearwardly in the machine between guide strip members 150 and supportably mounted on stationary cross rods 152. The drive for the forward movement of the data rack 146 is provided by a tension spring 154 coupled between front guide strip 150 and a stud 156 located centrally on the rack. Data rack 146 further has a lower toothed portion 158 in mesh with gear 160. A vertical type bar is shown at 161 carrying type elements 163 with values 0 through 9. Type bar 161 has a lower toothed portion 162 in engagement with the teeth of gear 160. Thus, the differential movement of the data rack 146 forwardly in the machines serves to elevate and select a digital print position of type bar 161 between hammer 164 and platen 166.

The mechanism for arresting data rack 146 in one of its decimal indicative positions is provided by read-in unit 39. Read-in unit 39 includes a solenoid 170 which has a clapper 172 engageable with the teeth of lower toothed portion 168 on data rack 146 to arrest the forward movement thereof. Solenoid 170 is normally energized or held down to withhold its clapper 172 from the path of tooth portion 168. Therefore, the time of de-energization of solenoid 170 will determine the digital value indicated by the position of the rack and will likewise determine the digital value printed out.

Also shown in FIG. 9 is the physical embodiment of the second pulse generator 38. The decimal switch assembly contains ten switches 120 as previously shown in connection with FIG. 8. The switch assembly is pivotably mounted on a stud 174 on a side frame of the bookkeeping machine. Data rack 146 has a shoe 176 mounted at its rearward end and downwardly depending therefrom, and the shoe is engageable with the ten switch actuating plungers for switches 120 of the switch assembly. Mechanism is provided for elevating the switch assembly into engagement with the lower surface of shoe 176 to close all the switches 120. This elevating mechanism is operable from the main cam shaft 126 through bell crank 180 which is pivotally mounted on a side frame of the bookkeeping machine on stud 182. Bell crank 180 carries a pair of rolls 184 and 184a. The rolls 184 and 184a engage the peripheries of a pair of complementary cams 186 and 187, respectively, which are fixed to cam shaft 126. The downward extending arm of bell crank 180 is coupled at its lower end to the forward end of a link 188 shown in part. The rearward end of link 188 is coupled to an upstanding arm 190 which is fixed to a cam plate 192. Cam plate 192 is pivotably mounted on a side frame of the bookkeeping machine and has an upper slot 194. Slot 192 engages a pin 196 extending laterally from the switch assembly of read-in unit 39. It will thus be seen that the clockwise motion of bell crank 180 through rotation of cam shaft 126 serves to pivot cam plate 192 in a counterclockwise direction whereby the switch assembly is elevated and the switch actuating plungers for switches 120 are depressed by contact with the lower surface of shoe 176. As soon as the data rack 146 is moved forwardly in the machine, shoe 176 carried by the data rack will sequentially open the switches 120, one after the other to produce a uniformly spaced group of pulses. For a more detailed explanation of the read-in unit 39 and pulse generator 38, see Bradshaw et al., Patent No. 2,822,752, of common ownership herewith.

*Description of Operation*

The description of operation may best be made with particular reference to FIGS. 1 and 2. The number for which it is desired to calculate a check digit is entered from a keyboard or accumulator into the rotary read-out unit 24 in a first cycle of operation of the accounting machine in the manner explained in the aforementioned Bradshaw and Butler patents. The single shot multivibrator 20 may be triggered as by a cam actuated switch operated from the program cam shaft 126 of the bookkeeping machine or the like in a manner well known in the art, to emit one positive going and one negative going pulse as shown at points A and B in FIG. 2. The negative pulse is used to set the flip flops 32 and 36 and reset the decade counter 34. The positive pulse initiates the operation of the first pulse distributor 22 whereby the first pulse distributor emits six time sequenced pulses as shown at $C_1$-$C_6$ in FIG. 2.

The first pulse distributor 22 operates to scan the rotary read-out 24 through the weight matrix associated therewith and initiate the action of the encoder 26 to produce pulse trains each representative of a different digit of the substitute number. Since flip flops 32 and 36 are in their set condition, gates 41, 42, and 44 are enabled. It should be noted that gate 44 has no significance in the check digit calculation operation, but is used in the subsequent verification operation. As shown in FIG. 2, the pulse output from encoder 26 and mixer 28 as shown at point F is fed through gate 41 to the verify flip flop 36 reset terminal supplied from lead 110 and also through the delay stage 30, gate 42, and mixer 46 as shown at point G to the decade counter 34. The output of the decade counter 34 is fed from line 104 to the set terminal of the verify flip flop 36 as indicated at point H, to set the verify flip flop 36 at the count of 10 output from the counter. The output from the "reset" and "set" of verify flip flop 36 are shown at points I and J, respectively. After the first pulse distributor 22 has scanned all the read-out switches 24, it emits a sense pulse which is the sixth pulse delayed and shaped in the form as shown at point K. The sense pulse resets the flip flop 32. The number in the read-out 24 will leave the verify flip flop 36 in the reset condition, unless the number has a check digit of (0) in which case the flip flop 36 will be set. With flip flops 32 and 36 in their reset condition, gates 43 and 45 are enabled. In the second cycle of operation of the accounting machine, which is automatically initiated under carriage program panel control upon completion of the first accounting machine cycle the carriage having moved to a different carriage position in which carriage position actuated switch 122 is now closed, the forward movement of data rack 146 is commenced and the pulse output of equally spaced pulses from the second pulse generator 38 is initiated. The output from the now enabled gate 43 holds the clapper of 172 of solenoid 170 in read-in unit 39 away from engagement with the lower toothed portion 168 of data rack 146, which is moved forwardly during the initial portion of this accounting machine cycle. The pulses from the second pulse generator 38, as indicated at point N, are fed through gate 45 and mixer 46 to the decade counter 34. When the decade counter 34 receives the correct number of pulses, i.e., sufficient to make the total count input equal to a multiple of "$n$" or ten in the present embodiment, the counter 34 is then reset to zero and produces an output pulse to set the verify flip flop 36 as indicated in FIG. 2 at point H. The output of gate 43 now goes to zero so that solenoid 170 of read-in unit 39 is de-energized. As best shown in FIG. 9, clapper 172 is then released to arrest the data rack 146 in a digit indicating position, also to disable the output or stop the production of further pulses from the second pulse generator 38. The selective positioning of the type rack 161 is accomplished through the lower toothed portion 158 on data rack 146 rotating gear 160 to elevate the type rack 161 into a corresponding check digit selective print position between hammer 164 and platen 166 for a normal print operation of the accounting machine as fully disclosed and described in the aforementioned Butler patent.

The manner in which a check digit for the amount 123456 is determined will now be shown. On receipt of the positive pulse from multivibrator 20, the six pulse sequence commences from the first pulse distributor 22. With reference to FIG. 2, the first pulse from the distributor 22 scans the digit "6" entered in the read-out switch for the first column. Since column one is a weighted column, the output from the encoder 26 at point F is three pulses. The second pulse or pulse applied on line C2, scans the digit "5" in the read-out switch for column two, which is an unweighted column, so that the encoder 26 produces five pulses. This process is repeated for the remainder of the digits as shown at point F with the number of pulses emitted by the encoder 26 being dependent upon the numbers in the columns and the weighting of the columns.

On receipt from the encoder-mixer of the 10th delayed pulse as shown at point G, the counter 34 sets the verify flip flop 36 and resets itself. On receipt of the 11th undelayed pulse which occurs just after the 10th delayed pulse from the encoder, as shown in connection with point F, the verify flip flop 36 is reset. Similarly, the 20th delayed pulse from the encoder output sets, and the 21st undelayed pulse resets the verify flip flop 36 again. The counter 34 then receives four additional pulses, leaving a deficiency of six pulses that would be required to set the control flip flop. After all columns have been scanned, the shaped pulse shown at point K, which is the sixth pulse delayed from the first pulse distributor 22, resets flip flop 32. Gate 45 is then enabled and, with verify flip flop 36 in the reset condition, gate 43 has an output to hold down read-in clapper 172. With the initiation of the second machine cycle in which the second pulse distributor is electrically enabled, the data rack 146 moves forward and the second pulse generator 38 starts to emit its pulses to the now enabled gate 45. After the data rack 146 has reached the sixth position, six pulses have been emitted. Since this is the number required to reset the counter 34 to zero, the output of gate 43 will become zero, releasing the clapper 172 to stop the data rack 146 in the sixth position and position the print bar 161 in a position to print out a "six." Thus the multidigit number 123456–6 is the complete self-checking number with check digit appended.

While the present embodiment has been described with reference to a modulus ten system, it will be appreciated that by simple alteration of the weighting matrix and/or the counter, the apparatus is readily adaptable to any checking system in which particular columns are weighted in a definite pattern.

We claim:

1. In a cyclically operable accounting machine for calculating a check digit for a multidigit number to which the digit to be calculated is to be assigned, said machine having numerical input means for storage of information during a first cycle of operation of said accounting machine and pulse emitting and encoding elements to convert the numerical representations of the multidigit amounts to a first series of pulses according to a predetermined code, a counter operably connected to said encoder to receive serially the pulse trains from said encoder, said counter cyclically operable to the base "$n$" and producing an output and resetting itself for every "$n$" count, a bistable control means operably connected to said encoder and said counter and receiving said first series of pulses from said encoder and the "$n$" count outputs from said counter, said control means triggered to one of its stable states by said first series of pulses and to its second stable state by said "$n$" count outputs, complementing pulse means connected to said "$n$" counter and activated by the second cycle of operation of said accounting machine and supplying a train of pulses to said "$n$" counter sufficient to reset said counter, sensing means operably connected to said bistable control means, activated in a second cycle of operation of said accounting machine and producing output signals corresponding to the number of pulses supplied by said complementing means to bring said "$n$" counter to a full count, and cyclically operable and differentially positionable means operably connected to said sensing means and advanceable in accordance with the number of output pulses of said sensing means signifying said check digit.

2. In a cyclically operable accounting machine for calculating a check digit for a multidigit number to which the digit to be calculated is to be assigned, said machine having numerical input means for storage of information during a first cycle of operation of said accounting machine and pulse emitting and encoding elements to convert the numerical representations of the multidigit amounts to a first series of pulses according to a predetermined code, a counter operably connected to said encoder to receive seriatim the pulse trains from said encoder, said counter cyclically operable to the base "$n$" and producing an output and resetting itself for every "$n$" count, a bistable control means operably connected to said encoder and said counter and receiving said first series of pulses from said encoder and the "$n$" count outputs from said counter, said control means triggered to one of its stable states by said first series of pulses and to its second stable state by said "$n$" count outputs, complementing pulse means operably connected to said "$n$" counter and activated in the second cycle of operation of said accounting machine and supplying a train of pulses to said "$n$" counter sufficient to reset said counter, and indicating means operably connected to said control means and activated by said second machine cycle of operation, said indicating means advanceable in accordance with the number of complementing pulses necessary to bring said "$n$" counter to a full count and indicative of the check digit for the multidigit amount.

3. In a check digit calculating apparatus for calculating a check symbol from and for a multidigit amount to which the symbol to be calculated is to be assigned, said apparatus having weighting and encoding means to convert numerical representations of multidigit amounts to a first series of pulses according to a predetermined pattern, the combination comprising, an "$n$" counter receiving said first series of pulses and producing an output pulse and resetting itself for the next count on every "$n$th" pulse supplied thereto, a second source of pulses supplying pulses to said counter after the termination of said first series of pulses to bring said counter to a full count, sensing means receiving said first series of pulses and every "$n$th" pulse supplied from said "$n$" counter and indicating an output if said "$n$" counter is fully loaded, and a cyclically operable and differentially positionable print out device operably connected to said sensing device and advanceable according to the number of pulses supplied by said second pulse source to bring said counter to a full "$n$" count, the number of pulses supplied by said second pulse source and the position to which said print out device has advanced being indicative of the calculated check symbol to be assigned to a multidigit amount numerically represented in said calculating apparatus.

4. Apparatus for calculating a check digit for a multidigit amout to which the digit to be calculated is to be assigned, said apparatus comprising, pulse emitting means to establish a pulse for each digit in the amount, means for weighting digit portions of the amount; an encoder operable by said pulse emitting means and in a predetermined time relationship therewith for transforming the weighted and unweighted digits into pulse trains representative of the said digits, a counter operable to receive seriatim the pulse trains from said encoder, said counter cyclically operable to the base "$n$," resettable to zero and producing an output for every "$n$" pulses; a bistable device operably connected to said encoder to receive said first train of pulses and to said "$n$" counter, said device assuming one stable stated upon receipt of pulses from said encoder and assuming a second stable state upon receipt of every "$n$th" output pulse from said "$n$" counter, a pulse generating means applying a train of pulses to said counter to bring said counter to a full "$n$" count upon termination of pulses from said first pulse emitting means, cyclically operable and differentially positionable means initiating the operation of said pulse generating means, and means operably connected to said bistable device and advanceable according to the number of pulses supplied to said counter by said pulse generating means.

5. Apparatus for calculating a check digit for a multidigit amount to which the digit to be calculated is to be assigned, said apparatus comprising pulse emitting means to establish a pulse for each digit in the amount, means for weighting particular digits of the amount according to a definite pattern, an encoder operably responsive to said pulse emitting means to transform the aforementioned weighted digit values into pulse trains representative of a substitute number, a counter operable to receive seriatim the pulse trains from said encoder, said counter cyclically operable to the base "$n$" and resettable to zero and producing an output for every "$n$" pulses, bistable control means coupled to said counter and being in its first stable condition after entry of the pulse trains in said counter, said counter being operably responsive to its resetting to establish said control means in its second stable condition, complementing means for applying a train of pulses sufficient to reset said counter, cyclically operable and differentially positionable means for initiating the operation of said complementing means, and means responsive to the change of said control means from its first to its second stable condition operable to arrest said cylically operable means in a check digit indicating position and to terminate the action of said complementing means.

6. Apparatus for calculating a check digit for a multidigit amount to which the digit to be calculated is to be assigned, said apparatus comprising, pulse emitting means to establish a pulse for each digit position in the amount, means for weighting and transmitting particular digits of the amount and for transmitting other digits unweighted, an encoder operable by said pulse emitting means and in a predetermined time relationship therewith for transforming the aforementioned weighted and unweighted digits into pulse trains, a counter operable to receive seriatim the pulse trains from said encoder, said counter cyclically operable to the base "$n$" and resettable to zero and producing an output for every "$n$" pulses, bistable control means coupled to said counter and to said encoder and capable of assuming one stable state if it is full and assuming a second stable state if the counter is not full, said control means being settable to its first stable state by the pulses from said encoder and being operably responsive to assume its second stable condition upon receipt of output pulses from said "$n$" counter, complementing means for applying a train of pulses to said counter, cylically operable and differentially positionable means for initiating the operation of said complementing means, and means responsive to the change of said bistable control means to its second stable condition operable to arrest said cyclically operable means in a check digit indicating position.

7. Apparatus for calculating a check digit for a multi-digit amount to which the digit to be calculated is to be assigned, said apparatus comprising, pulse emitting means to establish a pulse for each digit in the amount, means for weighting and transmitting alternate digits of the amount in a definite pattern and for transmitting the other digits unweighted, an encoder operably connected to said pulse emitting means for transforming the aforementioned weighted and unweighted digits into pulse trains representative of the said digits, a counter operably connected to receive seriatim the pulse trains from said encoder, said counter cyclically operable to the base "$n$" and resettable to zero and producing an output pulse for every "$n$" count, bistable control means coupled to said counter and to said encoder and being in its first stable condition after entry of the pulse trains from said pulse emitting means and in its second stable state responsive to the outputs from said counter, complementing means operably connected to said counter to apply a train of pulses sufficient to reset said counter, cyclically operable and differentially positionable means controlling the operation of said complementing means, and means responsive to the change of said control means from its first to its second stable condition and operable to position said cyclically operable means in a check digit indicating position.

8. Apparatus for calculating a check digit for a multi-digit amount to which the digit to be calculated is to be assigned, said apparatus including a pulse distributor comprising, a plurality of sequentially operable stages for establishing a pulse for each digit in the amount, a weighting matrix operable to weight and transmit the value of alternate digits of the amount and to transmit the other digits unweighted, an encoder comprising a plurality of sequentially operable stages for transforming the aforementioned weighted and unweighted digits into pulse trains representative of a substitute number and operably responsive to said pulse distributor, a counter operable to receive seriatim the pulse trains from said encoder, said counter cyclically operable to the base "$n$," resettable to zero and producing an output for every "$n$" pulse input, a bistable control means coupled to said counter and to said encoder, said bistable control means being responsive to pulses from said encoder placing it in its first stable condition and to said "$n$" output pulses from said "$n$" counter, placing it in its second stable condition, complementing means for applying a train of pulses sufficient to reset said counter, cyclically operable and differentially positionable means for initiating the operation of said complementing means, and means responsive to the change of said control means to its second stable condition operable to arrest said cyclically operable means in a check digit indicating position and to terminate the operation of said complementing means.

9. Apparatus for calculating a check digit for a multi-digit amount to which the digit to be calculated is to be assigned, said apparatus including a first pulse distributor comprising a plurality of sequentially operable stages for establishing a pulse for each digit in the amount, a weighting matrix operable to weight and transmit alternate digits of the amount "$n$" and to transmit the other digits unweighted, an encoder comprising a plurality of sequentially operable stages for transforming the aforementioned weighted and unweighted digits into pulse trains representative of a substitute number, a counter operable to receive seriatim the pulse trains from said encoder, said counter cyclically operable to the base "$n$" and resettable to zero, a bistable control means coupled to said counter and being in its first stable condition after entry of the substitute number, said counter being operable upon its resetting to establish said control means in its second stable condition, a pulse distributor comprising a row of switches coupled in parallel and sequentially actuable to apply a train of pulses sufficient to reset said counter, cyclically operable and differentially positionable means for initiating the operation of said second pulse distributor, and means responsive to the change of said control means to its second stable condition and operable to arrest said cyclically operable means in a check digit indicating position and to terminate the operation of said second pulse distributor.

10. Apparatus for calculating a check digit for a multi-digit amount to which the digit to be calculated is to be assigned, said apparatus comprising a first pulse distributor for establishing a pulse for each digit in the amount, a weighting matrix operable to weight and transmit the value of alternate digits of the amount and to transmit the other digits unweighted, an encoder operable by said first pulse distributor and comprising a plurality of sequentially operable stages for transforming the weighted and unweighted outputs of said matrix into pulse trains representative of a substitute number, a counter operable to receive seriatim the pulse trains from said encoder, said counter cyclically operable to the base "$n$" and resettable to zero, a flip flop coupled to the output of said counter and being in its first stable condition after entry of the substitute number, said counter being operable upon its resetting to establish said flip flop to its second stable condition, a second pulse distributor comprising a row of switches coupled in parallel actuable to apply a train of pulses sufficient to reset said counter, a cyclically operable and differentially movable data rack for successively opening the switches of said second pulse distributor, and means responsive to the change of state of said flip flop to its second stable condition operable to arrest said data rack in a check digit indicating position and to terminate the action of said complementing means.

11. Apparatus for calculating a check digit for a multi-digit amount to which the digit to be calculated is to be assigned, said apparatus comprising a first pulse distributor to establish a pulse for each digit in the amount, a weighting matrix operable to weight and transmit the value of the lowest denominational digit and alternate digits of the amount and to transmit the other digits unchanged, an encoder comprising a plurality of sequentially operable stages for transforming the weighted and unweighted outputs of said matrix into pulse trains representative of a substitute number and responsive to the operation of said first pulse distributor, counter means operable to receive seriatim the pulse trains from said encoder, said counter cyclically operable to the base "$n$" and resettable to zero, a flip flop coupled to the output of said counter and being in its first stable condition after the entry of the last pulse train into said counter, said counter operable upon its resetting to change said flip flop to its second stable condition, a second pulse distributor comprising a row of switches coupled in parallel and sequentially actuable to apply a train of pulses sufficient in number to reset said counter, a cyclically operable and differentially movable data rack for initiating the operation of said second pulse distributor, and normally energized electromagnetic means operable to be de-energized in response to the change of state of said flip flop to its second stable condition and effective to arrest said data rack in a check digit indicating position and to terminate the operation of said second pulse distributor.

12. Apparatus for calculating a check digit for a multi-digit amount to which the digit to be calculated is to be assigned, said apparatus comprising a first pulse distributor for establishing a pulse for each digit in the amount, a weighting matrix operable to weight the value of alternate digits of the amount, an encoder operable by said first pulse distributor and comprising a plurality of sequentially activated stages for transforming the weighted and unweighted outputs of said matrix into pulse trains representative of a substitute number, a counter including a quantizing core coupled to an "$n$" stage counting core, said counter being resettable to zero upon the receipt of each "$n$" number of pulses by the quantizing core whereby an output pulse is transmitted from the counting core, a flip flop coupled to the output from said counting core and to the encoder, said flip flop being in its first stable state after entry of the substitute number, if the total number of pulses supplied to the counter is different from an integral multiple of "$n$," and operable to be established in its second stable condition in response to the output from the counting core, a second pulse distributor comprising a row of switches coupled in parallel and sequentially actuable to apply a train of pulses sufficient to reset said counter, a cyclically operable and differentially movable data rack for initiating the operation of said second pulse distributor, and means responsive to the change of state of said flip flop to its second stable condition and operable to arrest said data rack in a check digit indicating position and to terminate the operation of said second pulse distributor.

13. Apparatus for calculating a check digit for a multidigit amount to which the digit to be calculated is to be assigned, said apparatus comprising means for weighting and transmitting alternate digits pursuant to a definite rule and transmitting the other digits unchanged, encoding means for transforming the aforementioned weighted and unweighted digits into pulse trains representative of a substitute number, a counter operable to receive seriatim the pulse trains from said encoding means, said counter cyclically operable to the base "$n$" and resettable to zero, a bistable control means coupled to said counter and being in its first stable condition after entry of the aforementioned pulse trains into said counter and changeable to its second stable condition responsive to each resetting of said counter to zero, complementing means operable to apply a train of pulses sufficient to reset said counter, cyclically operable and differentially positionable means for initiating the operation of said complementing means, and means responsive to the change of said bistable control means from its first to its second stable condition and operable to arrest said cyclically operable means in a check digit indicating position and to terminate the operation of said complementing means.

14. Apparatus for calculating a check digit for a multidigit amount to which the digit to be calculated is to be assigned, said apparatus comprising means for weighting alternate digits and transmitting the other digits unchanged, an encoder comprising a plurality of sequentially activatable stages for transforming the aforementioned weighted and unweighted digits into pulse trains representative of a substitute number, a counter operable to receive seriatim the pulse trains from said encoder, said counter cyclically operable to the base "$n$" and resettable to zero, a bistable control means coupled to said counter, said bistable control means being in its first stable condition after entry of the aforementioned pulse trains into said counter and changeable to its second stable condition responsive to the resetting of said counter to zero, complementing means operable to apply a train of pulses sufficient to reset said counter, a cyclically operable and differentially movable data rack for initiating the operation of said complementing means, and stop means responsive to the change of said bistable control means to its second stable condition operable to arrest said data rack in a check digit indicating position and to terminate the operation of said complementing means.

15. Means for deriving from a group of check symbols a check symbol for a multidigit number to which the symbol to be derived is to be assigned for subsequent use of the combined multidigit number and check symbol in apparatus verifying the correct entry of the combined multidigit number and check symbol, said means comprising numerical input means and storage means for entry and storage of said multidigit number, pulse emitting and encoding means coupled to said storage means to convert the stored representation of said multidigit number into a first series of electrical pulses according to a predetermined code, a cyclical counter operable to the base "$n$" connected to said encoder to receive serially the pulses from said encoder and producing an output and resetting itself for every "$n$th" count pulse applied thereto, complementing pulse generating means connected to said counter and operable after said first series of pulses have been supplied to said counter from said encoder to supply a second series of pulses to said counter if the total number of pulses supplied thereto from the encoder is different from an integral multiple of "$n$," sensing means determining if the total number of the first series of pulses supplied to the counter is different from an integral multiple of "$n$" including bistable control means connected to said encoder and to said counter and assuming one of its stable state conditions in response to pulses from said encoder and its other stable state condition in response to every "$n$th" count output pulse from the counter, means responsive to the change of state of said bistable control means from its first to its second stable condition and preventing the supply of pulses from the complementing means as soon as the bistable control means is in its second stable condition after the first series of pulses have been supplied to the counter from the encoder, and a check symbol indicating means synchronously operable with said complementing pulse generating means and sequentially advanceable over a group of indicating conditions each corresponding to a different one of the check symbols of the aforesaid group of check symbols, said check symbol indicating means arrestable in its advancement by said means responsive to a condition of said bistable control means to indicate the thus derived check symbol to be appended to said multidigit number and representative of the number of complementing pulses, if any, supplied to said counter from said complementing pulse generating means.

16. Means for deriving from a group of check symbols a check symbol for a multidigit number to which the symbol to be derived is to be assigned for subsequent use of the combined multidigit number and check symbol in apparatus verifying the correct entry of the combined multidigit number and check symbol, said means comprising a cyclically operable accounting machine having numerical input means and storage means for entry and storage of said multidigit number exclusive of said check symbol in a first cycle of operation of the machine, pulse emitting and encoding means coupled to said storage means to convert the stored representation of said multidigit number into a first series of electrical pulses according to a predetermined code, a cyclical counter operable to the base "$n$" connected to said encoder to receive serially the pulses from said encoder and producing an output and resetting itself for every "$n$th" count pulse applied thereto, complementing pulse generating means connected to said counter and operable from and in an ensuing cycle of operation of said accounting machine to supply a second series of pulses to said counter if the total number of pulses supplied thereto from the encoder is different from an integral multiple of "$n$," sensing means determining if the total number of the first series of pulses supplied to the counter is different from an integral multiple of "$n$" including bistable control means connected to said encoder and to said counter and assuming one of its stable state conditions in response to pulses from said encoder and its other stable state condition in response to every "$n$th" count output pulse from the counter, means responsive to the change of state of said bistable control means from its first to its second stable condition and preventing the supply of pulses from the complementing means as soon as the bistable control means is in its second stable condition in the ensuing cycle of operation of said accounting machine, and a check symbol indicating means synchronously operable with said complementing pulse generating means sequentially advanceable over a group of indicating conditions each corresponding to a different one of the check symbols of the aforesaid group of check symbols, said check symbol indicating means arrestable in its advancement by said means responsive to a condition of said bistable control means to indicate the thus derived check symbol to be appended to said multidigit number and representative of the number of complementing pulses, if any, supplied to said counter from said complementing pulse generating means.

17. The combination set forth in claim 16 above wherein said complementing pulse generating means comprises a differentially positionable actuating member cyclically operable with the accounting machine and a plurality of electrical switch elements sequentially operable by said actuating member and wherein said check symbol indicating means comprises a differentially positionable print bar coupled to said differentially positionable actuating member and carrying a plurality of print elements corresponding to the symbols of said group of check symbols.

18. Apparatus for first deriving from a group of check symbols a check symbol for a multidigit number to which the symbol to be derived is to be assigned for subsequent use of the combined multidigit number and check symbol and for thereafter verifying the correct entry of the combined multidigit number and check symbol in said apparatus comprising numerical input means and storage means for entry and storage of said multidigit number, pulse emitting and encoding means coupled to said storage means to convert the stored representation of said multidigit number into a first series of electrical pulses according to a predetermined code, a cyclical counter operable to the base "n" connected to said encoder to receive serially the pulses from said encoder and producing an output and resetting itself for every "nth" count pulse applied thereto, complementing pulse generating means connected to said counter and operable after said first series of pulses have been supplied to said counter from said encoder to supply a second series of pulses to said counter if the total number of pulses supplied thereto from the encoder is different from an integral multiple of "n," sensing means determining if the total number of the first series of pulses supplied to the counter is different from an integral multiple of "n" including bistable control means connected to said encoder and to said counter and assuming one of its stable state conditions in response to pulses from said encoder and its other stable state condition and response to every "nth" count output pulse from the counter, means responsive to the change of state of said bistable control means from its first to its second stable condition and preventing the supply of pulses from the complementing means as soon as the bistable control means is in its second stable condition after the first series of pulses have been supplied to the counter from the encoder, check symbol indicating means synchronously operable with said complementing pulse generating means and sequentially advanceable over a group of indicating conditions each corresponding to a different one of the check symbols of the aforesaid group of check symbols, said check symbol indicating means arrestable in its advancement by said means responsive to a condition of said bistable control means to indicate the thus derived check symbol to be appended to said multidigit number and representative of the number of complementing pulses, if any, supplied to said counter from said complementing pulse generating means, and further indicating means coupled to said bistable control means and activatable thereby if any only if the total number of pulses supplied to the counter from the encoder in a subsequent entry into the numerical input means of the complete multidigit number and derived check symbol has left the counter in its "n" count condition and the bistable control means in its second stable condition, said further indicating means verifying in the activated condition thereof the correct entry of the multidigit number and assigned check symbol.

19. Apparatus for first deriving from a group of check symbols a check symbol for a multidigit number to which the symbol to be derived is to be assigned for subsequent use of the combined multidigit number and check symbol and for thereafter verifying the correct entry of the combined multidigit number and check symbol in said apparatus comprising a cyclically operable accounting machine having numerical input means and storage means for entry and storage of said multidigit number exclusive of said check symbol in a first cycle of operation of the machine, pulse emitting and encoding means coupled to said storage means to convert the stored representation of said multidigit number into a first series of electrical pulses according to a predetermined code, a cyclical counter operable to the base "n" connected to said encoder to receive serially the pulses from said encoder and producing an output and resetting itself for every "nth" count pulse applied thereto, complementing pulse generating means connected to said counter and operable from and in a second cycle of operation of the accounting machine to supply a second series of pulses to said counter if the total number of said first series of pulses supplied thereto from the encoder is different from an integral multiple of "n," sensing means determining if the total number of the first series of pulses supplied to the counter is different from an integral multiple of "n" including bistable control means connected to said encoder and to said counter and assuming one of its stable state conditions in response to pulses from said encoder and its other stable state condition in response to every "nth" count output pulse from the counter, means responsive to the change of state of said bistable control means from its first to its second stable condition and preventing the supply of pulses from the complementing means as soon as the bistable control means is in its second stable condition in the second cycle of operation of said accounting machine, check symbol indicating means synchronously operable with said complementing pulse generating means and sequentially advanceable over a group of indicating conditions each corresponding to a different one of the check symbols of the aforesaid group of check symbols, said check symbol indicating means arrestable in its advancement by said means responsive to a condition of said bistable control means to indicate the thus derived check symbol to be appended to said multidigit number and representative of the number of complementing pulses, if any, supplied to said counter from said complementing pulse generating means, and further indicating means coupled to said bistable control means and operable thereby if and only if the total number of a third series of pulses supplied to the counter from the encoder in a subsequent entry into the numerical input means of the complete multidigit number and derived check symbol in a third cyle of operation of the accounting machine has left the counter in its "n" count condition and the bistable control means in its second stable condition, said further indicating means verifying in the operated condition thereof the correct entry of the multidigit number and assigned check symbol.

References Cited in the file of this patent

UNITED STATES PATENTS

| | | |
|---|---|---|
| 2,886,240 | Linsman | May 12, 1959 |
| 2,888,199 | Reumerman et al. | May 26, 1959 |
| 2,911,149 | Rouche | Nov. 3, 1959 |
| 3,040,984 | Cox et al. | June 26, 1962 |
| 3,040,985 | Glaser et al. | June 26, 1962 |